(12) United States Patent
Yakovenko et al.

(10) Patent No.: US 12,493,538 B2
(45) Date of Patent: Dec. 9, 2025

(54) COMPUTING DEVICE AND METHOD FOR USE IN THE COMPUTING DEVICE

(71) Applicant: Huawei Technologies Co., Ltd., Shenzhen (CN)

(72) Inventors: Roman Yakovenko, Munich (DE); Michael Hirsch, Munich (DE); Dan Bar Dov, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 18/432,327

(22) Filed: Feb. 5, 2024

(65) Prior Publication Data

US 2024/0176704 A1    May 30, 2024

Related U.S. Application Data

(63) Continuation of application No. PCT/EP2021/071639, filed on Aug. 3, 2021.

(51) Int. Cl.
*G06F 11/20* (2006.01)
*G06F 11/14* (2006.01)

(52) U.S. Cl.
CPC ...... *G06F 11/2094* (2013.01); *G06F 11/1435* (2013.01); *G06F 11/1471* (2013.01); *G06F 2201/80* (2013.01)

(58) Field of Classification Search
CPC ............ G06F 11/1435; G06F 11/1471; G06F 11/2056; G06F 11/2074; G06F 11/2076; G06F 11/2094; H04L 67/1095
See application file for complete search history.

(56) References Cited

U.S. PATENT DOCUMENTS

| | | | |
|---|---|---|---|
| 8,145,838 B1 * | 3/2012 | Miller | G06F 11/2035 711/161 |
| 2012/0166886 A1 * | 6/2012 | Shankar | G06F 11/2038 714/E11.206 |
| 2012/0239856 A1 * | 9/2012 | Cho | G06F 11/1441 711/E12.103 |
| 2021/0073198 A1 * | 3/2021 | Srinivasan | G06F 11/1471 |

* cited by examiner

*Primary Examiner* — Michael Maskulinski
(74) *Attorney, Agent, or Firm* — Conley Rose, P.C.

(57) ABSTRACT

A computing device is configured to operate as a server in a cluster system. The computing device includes a controller, a local memory and a communications interface. The communications interface is configured to connect to a second computing device and to connect to a shared memory configured to store data. The controller is configured to receive a command from a client and determine redo and/or undo information relating to the command. The controller is further configured to store the redo and/or undo information in the local memory and to store the redo and/or undo information in the local memory of the second computing device, thereby mirroring the redo and/or undo information, where the local memory is a persistent memory.

20 Claims, 4 Drawing Sheets

COMPUTING DEVICE AND METHOD FOR USE IN THE COMPUTING DEVICE

CROSS-REFERENCE TO RELATED APPLICATIONS

This application is a continuation of International Patent Application No. PCT/EP2021/071639 filed on Aug. 3, 2021, which is hereby incorporated by reference in its entirety.

TECHNICAL FIELD

The present disclosure relates generally to the field of database management; and more specifically, to a computing device configured to operate as a server in a cluster system and a method for use in the computing device.

BACKGROUND

Generally, databases require to save redo and undo information. The reason being the redo information (or redo data) is used to reconstruct latest version of pages in case of a failure(s) of a typical server. Typically, databases employ write changes to redo logs (or redo log files) as the changes are committed. The updated pages are swept from a typical memory through a checkpoint mechanism. The redo logs are required in case a crash (or failure), in which case the redo logs are used to reconstruct the latest version of the pages. In a case of a typical cluster, a surviving node is required to access the redo logs of a node that has been crashed in order to perform the reconstruction. In spite of using the redo logs in the crash, the redo logs are generally write-only. Similar to the redo logs, the typical databases employ undo logs to reconstruct previous versions of pages that are consistent with a point in time when a transaction started. This ensures that a client running the transaction sees a consistent view of the data. In another case of the typical cluster, the surviving node is required to access the undo logs of the node that crashed in order to perform reconstruction of previous versions of pages of transactions that are still underway. In spite of using the undo logs in the crash, the undo logs are written generally, and read often. However, despite of storing the redo and undo logs in a concise form (with minimal changes) and in a concise manner (in form of sequential writes wherever it is possible), the redo and undo logs still consume a significant portion of a bandwidth between database engines and common storage. This, in turn, resulting in higher latencies and have an overall effect of lowering the throughput (or speed) of the database.

Currently, certain attempts have been made to reduce the latencies and improve the throughput of the database. In a conventional method, the undo logs and the redo logs are stored to a storage layer that is commonly accessible by all the database engines. The storage layer is generally referred to as a "never fail" layer. Such storage of the redo logs and the undo logs to the storage layer may also be referred to as an enterprise-class expensive storage. Therefore, such type of storage is expensive as well as it required to be fast in order not to delay transactions. All data that is written to the redo logs and the undo logs is required to be sent through the whole protocol stack and any data that is required must be read explicitly through the whole protocol stack. This issue become especially acute when it is required to recover the data from failure of the node in the case of the typical clustered database, where the whole database can face a brown-out lasting minutes at best. Thus, there exists a technical problem of inefficiently and inadequately using the bandwidth between database engines and the common storage, resulting in higher latencies and lowering the throughput (or speed) of the database.

Therefore, in light of the foregoing discussion, there exists a need to overcome the aforementioned drawbacks associated with the conventional methods of reducing the latencies and improving the throughput of the database.

SUMMARY

The present disclosure provides a computing device configured to operate as a server in a cluster system and a method for use in the computing device. The present disclosure provides a solution to the existing problem of inefficiently and inadequately using the bandwidth between database engines and the common storage, resulting in higher latencies and lowering the throughput (or speed) of the database. An aim of the present disclosure is to provide a solution that overcomes at least partially the problems encountered in other approaches and provide an improved computing device configured to operate as a server in a cluster system and a method for use in the computing device, for reducing the latencies and improving the throughput of the database.

The object of the present disclosure is achieved by the solutions provided in the enclosed independent claims. Advantageous implementations of the present disclosure are further defined in the dependent claims.

In one aspect, the present disclosure provides a computing device configured to operate as a server in a cluster system. The computing device comprises a controller, a local memory and a communications interface. The communications interface is configured to connect to a second computing device and to connect to a shared memory configured to store data. The controller is configured to receive a command from a client and the command relating to at least portion of the data stored in the shared memory. The controller is further configured to determine redo and/or undo information relating to the command and to store the redo and/or undo information in the local memory and to store the redo and/or undo information in the local memory of the second computing device, thereby mirroring the redo and/or undo information, wherein the local memory is a persistent memory.

The disclosed computing device provides an efficient and adequate usage of the bandwidth between various database servers and a common storage, resulting in reduced latencies and increasing the throughput (or speed) of the cluster (or database) system. The storage of the redo and/or undo information of each of the computing device and the second computing device in the local memory of each other leads to a high-speed data access as well as mirroring of the redo and/or undo information of each other. This further helps in recovering the lost transactions of a computing device (e.g., the second computing device) that gets crashed, and a surviving device (e.g., the computing device) recovers the lost transactions using the redo and/or undo information that is mirrored to its local memory. This greatly accelerates the recovery because there is not any requirement to read the redo and/or undo information from common storage.

In an implementation form, the controller is further configured to determine that a connection to the second computing device is faulty and in response thereto store the redo and/or undo information in the shared memory instead of in the local memory of the second computing device.

By virtue of storing the redo and/or undo information of the second computing device in the shared memory in case of the fault connection to the second computing device, provides an efficient and fast recovery of lost transactions of the second computing device using the redo and/or undo information stored in the shared memory.

In a further implementation form, the local memory is configured to receive redo and/or undo information from another computing device and to store the redo and/or undo information of the other computing device.

The storage of the redo and/or undo information of the other computing device in the local memory leads to mirroring of the redo and/or undo information. This further results into an efficient and fast recovery of the lost transactions of the other computing device in case of a failure of the other computing device.

In a further implementation form, the other computing device is the second computing device.

In an implementation, the other computing device is the second computing device that is connected to the local memory of the computing device, consequently, results into a connected cluster system.

In a further implementation form, the controller is further configured to store the redo and/or undo information in the local memory of the second computing device utilizing a remote direct memory access (RDMA) write command.

The use of the RDMA write command leads to a high speed while storing the redo and/or undo information in the local memory of the second computing device.

In a further implementation form, the controller is further configured to store the redo and/or undo information in the local memory using direct access.

The use of direct memory access (DMA) provides a fast storage of the redo and/or undo information in the local memory of the computing device.

In a further implementation form, the computing device is configured to operate as a database server in a database system and wherein the client is a database client.

The computing device provides an improved throughput when used as the database server in the database system and the client is the database client.

In another aspect, the present disclosure provides a method for use in a computing device operating as a server in a cluster system, wherein the computing device comprises a local memory. The method comprises receiving a command from a client, the command relating to at least portion of the data stored in a shared memory. The method further comprises determining redo and/or undo information relating to the command and storing the redo and/or undo information in the local memory and storing the redo and/or undo information in the local memory of the second computing device, thereby mirroring the redo and/or undo information, wherein the local memory is a persistent memory.

The method achieves all the advantages and technical features of the computing device of the present disclosure.

In a yet another aspect, the present disclosure provides a computer-readable media comprising instructions that when loaded into and executed by a memory controller enables the memory controller to execute the method.

The memory controller (e.g., controller of the computing device) achieves all the advantages and effects of the method after execution of the method.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
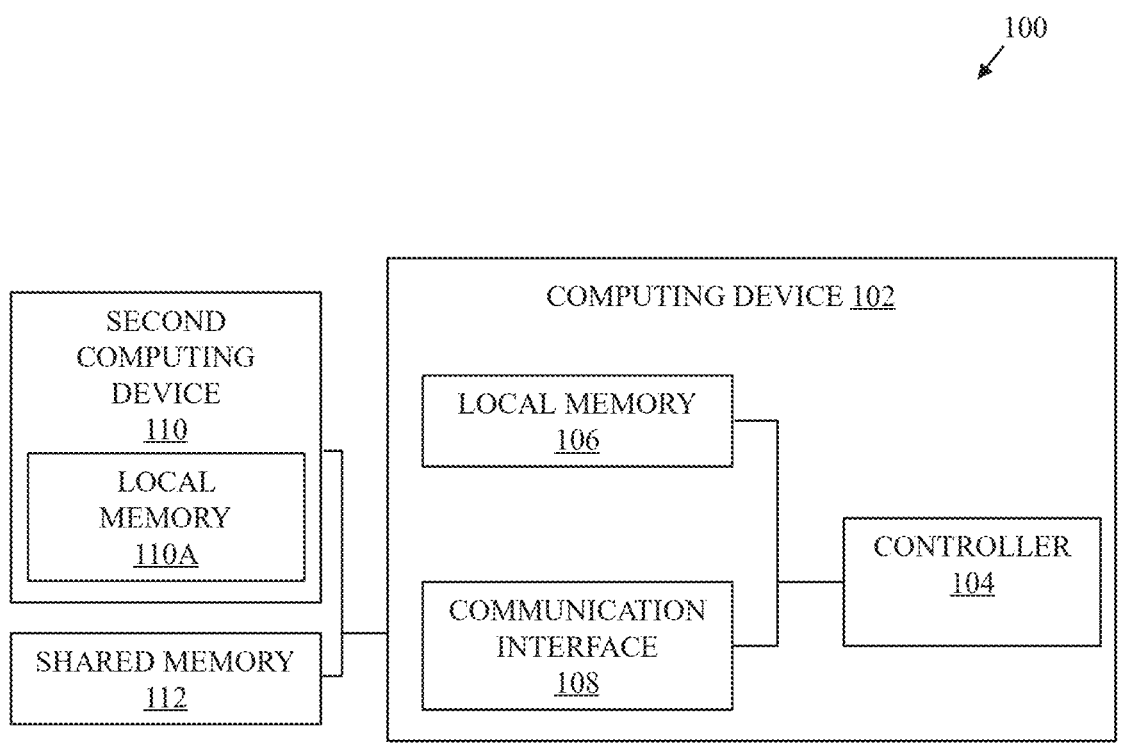
FIG. 1 is a block diagram that illustrates various exemplary components of a computing device, in accordance with an embodiment of the present disclosure.

FIG. 1 is a block diagram that illustrates various exemplary components of a computing device, in accordance with an embodiment of the present disclosure. With reference to FIG. 1, there is shown a block diagram 100 of a computing device 102 that includes a controller 104, a local memory 106 and a communication interface 108. There is further shown a second computing device 110 and a shared memory 112. The second computing device 110 has a local memory 110A.

The computing device 102 includes suitable logic, circuitry, interfaces, and/or code that is configured to operate as a server in a cluster system. In an implementation, the computing device 102 may be a single hardware server. In another implementation, the computing device 102 may be a plurality of hardware servers operating in a parallel or distributed architecture to form a backup system. Examples of the computing device 102 include, but are not limited to a storage server, a web server, an application server, or a combination thereof. The second computing device 110 corresponds to the computing device 102. In a use case, the computing device 102 may be used in a distributed application having a persistent state which is visible to an end user. For example, a distributed file system, in which the end user may write data to a data file and gets "OK" in acknowledgement. From that point of time, the distributed file system is responsible for durability. The distributed file system may store data in a fast temporal storage and move it later to another tier.

The controller 104 includes suitable logic, circuitry, interfaces, or code that is configured to receive a command from a client. In an implementation, the controller 104 may be configured to execute the instructions stored in the local memory 106. Examples of the controller 104 may include, but are not limited to, a microcontroller, a microprocessor, a central processing unit (CPU), a complex instruction set computing (CISC) processor, an application-specific integrated circuit (ASIC) processor, a reduced instruction set (RISC) processor, a very long instruction word (VLIW) processor, a data processing unit, and other processors or control circuitry. Moreover, the controller 104 may refer to one or more individual processors, processing devices, a processing unit that is part of a machine, such as the computing device 102.

The local memory 106 includes suitable logic, circuitry, interfaces, or code that is configured to store redo and undo information which is used to reconstruct latest version of pages and previous versions of pages, respectively, in case of a failure of a computing device in a system. In an implementation, the local memory 106 may be configured to store data and the instructions executable by the controller 104. Examples of implementation of the local memory 106 may include, but are not limited to, an electrically erasable programmable read-only memory (EEPROM), random-access memory (RAM), read-only memory (ROM), hard disk drive (HDD), flash memory, solid-state drive (SSD), or CPU cache memory. The local memory 106 may store an operating system or other program products (including one or more operation algorithms) to operate the computing device 102.

The communication interface 108 includes suitable logic, circuitry, and/or interfaces that is configured to connect to the second computing device 110 and to connect to the shared memory 112 configured to store data. In an implementation, the communication interface 108 may be configured to communicate with one or more computing devices, such as the second computing device 110. Examples of the communication interface 108 may include, but is not limited to, a transceiver, an antenna, a telematics unit, a radio frequency (RF) transceiver, and/or a subscriber identity module (SIM) card.

In operation, the computing device 102 configured to operate as a server in a cluster system, wherein the computing device 102 comprises a controller 104, a local memory 106 and a communications interface 108. The communications interface 108 is configured to connect to a second computing device 110 and to connect to a shared memory 112 configured to store data. The computing device 102 is configured to operate as a server in a cluster system. Each of the computing device 102 and the second computing device 110 may also be referred to as a database (DB) server or a compute node that runs a DB engine. Generally, the compute node may be defined as a node on which work runs. Alternatively stated, the compute node performs a computational work in the cluster system and the computational work can be provisioned by the cluster system (e.g., a management node). The number of slots on the compute node is defined by the cluster system. The cluster system may also be referred to as a workload management system. A database server may be defined as a server which uses a database application that provides database services to other computer programs or to computers, as defined by a client service model. The cluster system may also be referred to as a cluster which may have two or more computing devices, such as the computing device 102 and the second computing device 110. The communication interface 108 is configured to connect to the second computing device 110. In one possible way, the communication interface 108 may be configured to connect to the local memory 110A of the second computing device 110. More specifically, the connection is created between services or processes running on the computing device 102 as well as on the second computing device 110. These processes decide where the peer data should be stored in the cluster system. However, other possible ways of connecting the communication interface 108 to the second computing device 110 may also be used. The communication interface 108 is further configured to connect to the shared memory 112 that is configured to store data. The shared memory 112 may also be configured to store the peer data. The shared memory 112 is accessible to the computing device 102 and the second computing device 110 as well. The shared memory 112 may also be referred to as a common storage.

The controller 104 is configured to receive a command from a client, the command relating to at least portion of the data stored in the shared memory 112. The controller 104 is further configured to determine redo and/or undo information relating to the command and to store the redo and/or undo information in the local memory 106 and store the redo and/or undo information in the local memory 110A of the second computing device 110, thereby mirroring the redo and/or undo information, wherein the local memory 106 is a persistent memory. The controller 104 is configured to receive the command from the client. The client may also be referred to as a database (DB) client. The command received from the client is related to the at least portion of the data stored in the shared memory 112. The command received from the client may also be referred to as one or more queries. The controller 104 is configured to determine redo and undo information based on the command and to store the redo and undo information in the local memory 106 as well as in the local memory 110A of the second computing device 110. By virtue of storing the redo and undo information in the local memory 110A of the second computing device 110, the redo and undo information is mirrored. The storage of the mirrored copies of the redo and undo information helps in recovering the data in a case of a failure of a computing device (e.g., the computing device 102 and the second computing device 110) of the cluster system. Each of the local memory 106 of the computing device 102 and the local memory 110A of the second computing device 110 is the persistent memory. Generally, the persistent memory may be used for efficiently storing data structures such that the stored data structures can continue to be accessed using memory instructions or memory application programming interface (APIs) even after the end of the process that created or last modified the data structures. The persistent memory is like regular memory, but it is persistent across server crashes, like hard disk or SSD. However, the persistent memory is byte-addressable like regular memory and can be accessed using RDMA. The use of the persistent memory provides a fast access to the data stored in it. The local memory 106 of the computing device 102 and the local memory 110A of the second computing device 110 may be a part of a single local memory (or persistent memory) which is shared or divided between the computing device 102 and the second computing device 110 (or nodes) and there is an arrangement that the computing device 102 does not touch the part of the local memory that is shared with the second computing device 110, while the second computing device 110 is healthy, or vice-versa. This also means that the second computing device 110 does not touch the part of the local memory that is shared with the computing device 102, while the computing device 102 is healthy. Thus, the sharing of the local memory works in both directions that is from the computing device 102 to the second computing device 110 and from the second computing device 110 to the computing device 102.

In accordance with an embodiment, the controller 104 is further configured to determine that a connection to the second computing device 110 is faulty and in response thereto store the redo and/or undo information in the shared memory 112 instead of in the local memory 110A of the second computing device 110. The controller 104 is further configured to determine that the connection to the local memory 110A (or the persistent memory) of the second computing device 110 is faulty. In an example, the connection to the local memory 110A of the second computing device 110 may be either broken, or too slow or not possible. In another example, the connection to the local memory 110A of the second computing device 110 is termed as faulty, the reason being either the second computing device 110 is not responding or not found in the cluster system. In response to the fault connection to the local memory 110A of the second computing device 110, the redo and undo information is stored in the shared memory 112 instead of the local memory 110A of the second computing device 110. In an example, in a case to the fault connection to the second computing device 110, more redo and/or undo information is generated during recovery of the connection to the second computing device 110. The generated redo and/or undo information is stored in the local memory 106 of the computing device 102 as well as in the shared memory 112 in order to ensure dual copies. After recovery of the connection to the second computing device 110, the local memory 110A is updated.

In accordance with an embodiment, the local memory 106 is configured to receive redo and/or undo information from another computing device and to store the redo and/or undo information of the other computing device. The local memory 106 of the computing device 102 is configured to receive the redo and undo information from the other computing device (e.g., the second computing device 110) and to store the redo and undo information of the other computing device. Thus, mirroring the redo and undo information of the other computing device into the local memory 106 of the computing device 102. Thereafter, the computing device 102 becomes able to recover the lost transactions of the other computing device using the redo information of the other computing device (or a crashed server) that were mirrored to the local memory 106. This in turn, greatly accelerates the recovery because there is no requirement to read this information from common storage.

In accordance with an embodiment, the other computing device is the second computing device 110. In an implementation, the other computing device may be the second computing device 110. The cluster system has two computing devices (i.e., the computing device 102 and the second computing device 110). The cluster system may be generalized to more than two computing devices. The cluster system may have n number of computing devices (or severs) where kth server mirrors have their save area in the persistent memory of the (k+1) % nth server.

In accordance with an embodiment, the controller 104 is further configured to store the redo and/or undo information in the local memory 110A of the second computing device 110 utilizing a RDMA write command. The controller 104 is configured to store the redo and undo information of the computing device 102 in the local memory 110A of the second computing device 110 by use of the RDMA write command. The RDMA write command is single-sided. The local memory 110A of the second computing device 110 may also be referred to as a remote persistent memory.

In accordance with an embodiment, the controller 104 is further configured to store the redo and/or undo information in the local memory 106 using direct access. The controller 104 is configured to store the redo and undo information of the computing device 102 in the local memory 106 using DMA commands. This means simple memory read/write instructions are enough to store the redo and undo information of the computing device 102 in the local memory 106.

In accordance with an embodiment, the computing device 102 is configured to operate as a database server in a database system and wherein the client is a database client. The computing device 102 is configured to operate as the database server in the database system. This means that the cluster system may also be referred to as the database system or the database cluster. The client is the database client.

Thus, each of the computing device 102 and the second computing device 110 is configured to store the redo and/or undo information in the local memory (i.e., the local memory 106 and the local memory 110A) of each other, resulting into a high-speed data access at a significantly reduced latency. Moreover, the redo and/or undo information of the computing device 102 is stored in the local memory 106 (using DMA) as well as in the local memory 110A of the second computing device 110 (using single-sided RDMA write command). Similarly, the redo and/or undo information of the second computing device 110 is stored in the local memory 110A as well as in the local memory 106 of the computing device 102. The storage of the redo and/or undo information of each of the computing device 102 and the second computing device 110 in the local memory (i.e., the local memory 106 and the local memory 110A) of each other leads to mirroring the redo and/or undo information of each other. This further helps in recovering the lost transactions of a computing device (e.g., the second computing device 110) that gets crashed, and a surviving device (e.g., the computing device 102) recovers the lost transactions using the redo and/or undo information that is mirrored to its local memory (e.g., the local memory 106). This greatly accelerates the recovery because there is not any requirement to read the redo and/or undo information from common storage.

Figure 2:
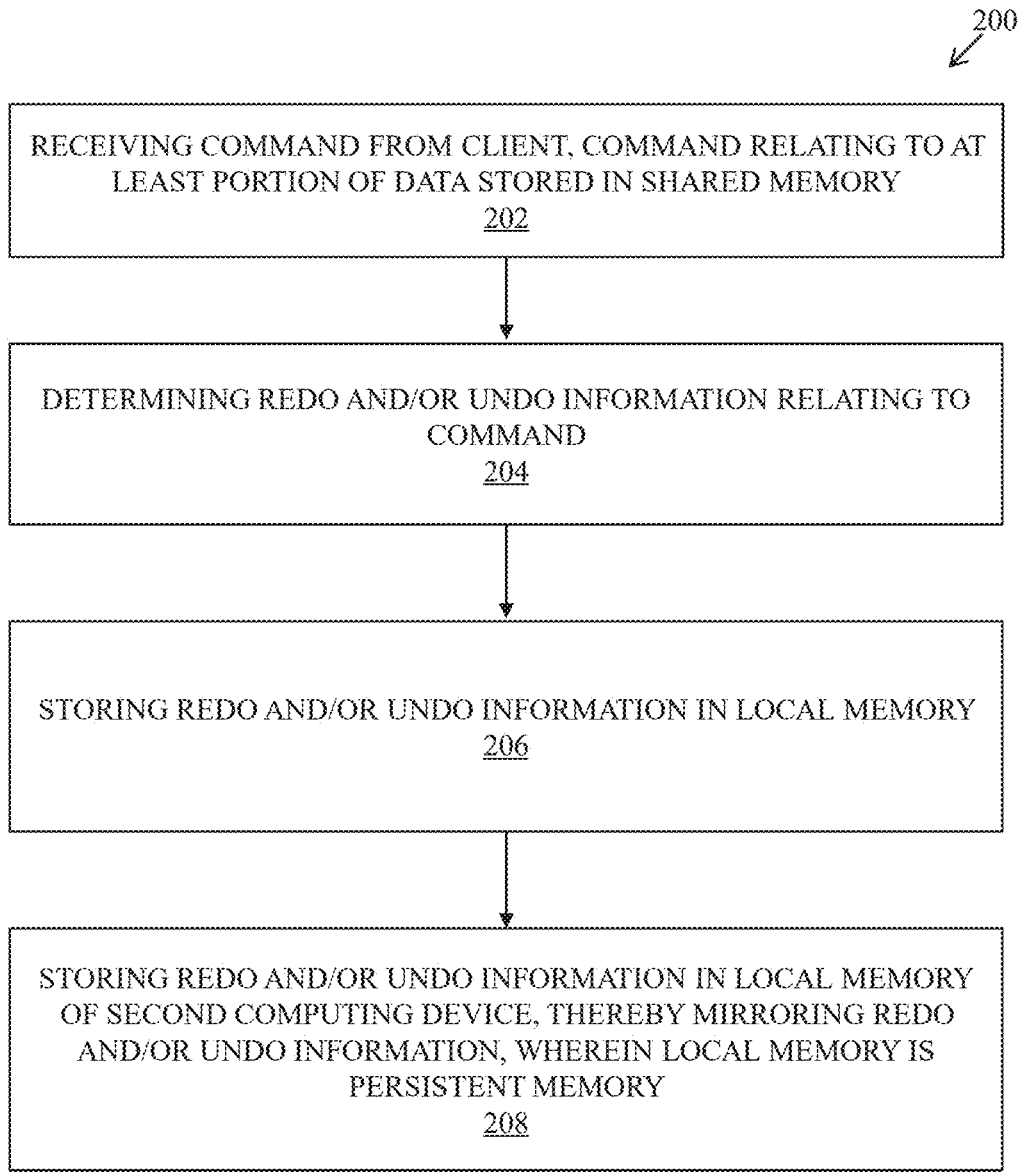
FIG. 2 is a flowchart of a method for use in a computing device operating as a server in a cluster system, in accordance with an embodiment of the present disclosure.

FIG. 2 is a flowchart of a method for use in a computing device operating as a server in a cluster system, in accordance with an embodiment of the present disclosure. FIG. 2 is described in conjunction with elements from FIG. 1. With reference to FIG. 2, there is shown a method 200 for use in the computing device 102 (of FIG. 1). The method 200 includes 202-to-208 steps. The method 200 is executed by the controller 104 of the computing device 102.

The present disclosure provides a method (i.e., the method 200) for use in a computing device (e.g., the computing device 102) operating as a server in a cluster system, wherein the computing device 102 comprises a local memory 106, wherein the method 200 comprises: receiving a command from a client, the command relating to at least portion of the data stored in a shared memory 112; determining redo and/or undo information relating to the command; storing the redo and/or undo information in the local memory 106; and storing the redo and/or undo information in the local memory 110A of the second computing device 110, thereby mirroring the redo and/or undo information, wherein the local memory (i.e., the local memory 106 and the local memory 110A) is a persistent memory.

At step 202, the method 200 comprises receiving a command from a client, the command relating to at least portion of the data stored in a shared memory 112. More specifically, the controller 104 of the computing device 102 is configured to receive the command (or a query) from the client. The command received from the client is related to the at least portion of the data stored in the shared memory 112.

At step 204, the method 200 further comprises determining redo and/or undo information relating to the command. After receiving the command from the client, the controller 104 of the computing device 102 is further configured to determine the redo and/or undo information based on the received command.

At step 206, the method 200 further comprises storing the redo and/or undo information in the local memory 106. After determining the redo and/or undo information based on the received command, the controller 104 of the computing device 102 is further configured to store the determined redo and/or undo information in the local memory 106 resulting into a fast access to the redo and/or undo information.

At step 208, the method 200 further comprises storing the redo and/or undo information in the local memory 110A of the second computing device 110, thereby mirroring the redo and/or undo information, wherein the local memory (i.e., the local memory 106 and the local memory 110A) is a persistent memory. After storing the redo and/or undo information in the local memory 106, the controller 104 of the computing device 102 is further configured to store the redo and/or undo information in the local memory 110A of the second computing device 110 that leads to mirroring the redo and/or undo information of the computing device 102. The mirroring of the redo and/or information helps the second computing device 110 to recover the lost information of the computing device 102 in case of a failure of the computing device 102.

In accordance with an embodiment, the method 200 further comprises determining that a connection to the second computing device 110 is faulty and in response thereto storing the redo and/or undo information in the shared memory 112 instead of in the local memory 110A of the second computing device 110. In an implementation, the controller 104 of the computing device 102 is configured to determine that the connection to the local memory 110A (or the persistent memory) of the second computing device 110 is faulty. In response to the fault connection to the local memory 110A of the second computing device 110, the controller 104 is configured to store the redo and undo information in the shared memory 112 instead of the local memory 110A of the second computing device 110.

In accordance with an embodiment, the local memory 106 is configured to receive redo and/or undo information from another computing device and wherein the method 200 further comprises storing the redo and/or undo information of the other computing device. The local memory 106 of the computing device 102 is configured to receive the redo and undo information from the other computing device (e.g., the second computing device 110). In response to receiving the redo and/or undo information from the other computing device, the controller 104 is configured to store the redo and undo information of the other computing device in the local memory 106. Thus, mirroring the redo and undo information of the other computing device into the local memory 106 of the computing device 102 that further helps in recovering the lost transactions of the other computing device.

In accordance with an embodiment, the other computing device is the second computing device 110. In an implementation, the other computing device is the second computing device 110.

In accordance with an embodiment, the method 200 further comprises storing the redo and/or undo information in the local memory 110A of the second computing device 110 utilizing a RDMA write command. The controller 104 is configured to store the redo and undo information of the computing device 102 in the local memory 110A of the second computing device 110 by use of the single-sided RDMA write command. The use of the RDMA write command provides an efficient usage of bandwidth between the computing device 102 and the second computing device 110 at a reduced latency as well.

In accordance with an embodiment, the method 200 further comprises storing the redo and/or undo information in the local memory 106 using direct access. The controller 104 is configured to store the redo and undo information of the computing device 102 in the local memory 106 using memory direct access.

In accordance with an embodiment, the computing device 102 is configured to operate as a database server in a database system and wherein the client is a database client. The computing device 102 is configured to operate as the database server in the database system. This means that the cluster system may also be referred to as the database system or the database cluster. The client is the database client.

In accordance with an embodiment, a computer-readable media comprising instructions that when loaded into and executed by a memory controller (e.g., the controller 104 of the computing device 102) enables the memory controller to execute the method 200. The memory controller (i.e., the controller 104 of the computing device 102) achieves all the advantages and technical features of the computing device 102 after executing the method 200 (of FIG. 2).

Thus, the method 200 provides an efficient and adequate usage of the bandwidth between various database servers (e.g., the computing device 102 and the second computing device 110) and a common storage, resulting in reduced latencies and increasing the throughput (or speed) of the database. The storage of the redo and/or undo information of each of the computing device 102 and the second computing device 110 in the local memory of each other leads to a high-speed data access as well as mirroring of the redo and/or undo information of each other. This further helps in recovering the lost transactions of a computing device (e.g., the second computing device 110) that gets crashed, and a surviving device (e.g., the computing device 102) recovers the lost transactions using the redo and/or undo information that is mirrored to its local memory. This greatly accelerates the recovery because there is not any requirement to read the redo and/or undo information from common storage.

The steps 202-to-208 are only illustrative, and other alternatives can also be provided where one or more steps are added, one or more steps are removed, or one or more steps are provided in a different sequence without departing from the scope of the claims herein.

Figure 3A:
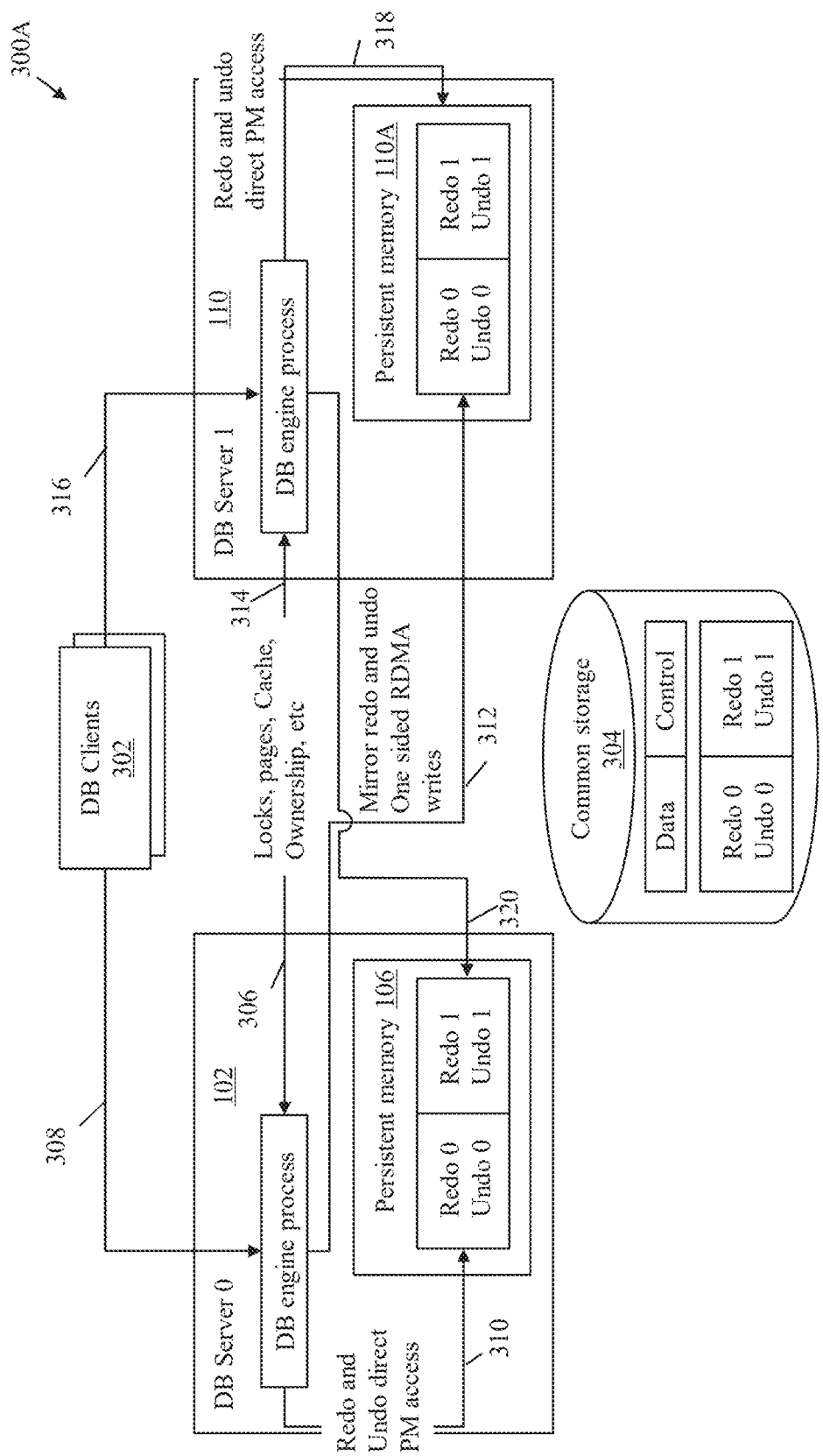
FIG. 3A illustrates a cluster system that depicts use of persistent memory for mirroring the redo and undo information of one or more computing devices, in accordance with an embodiment of the present disclosure.

FIG. 3A illustrates a cluster system that depicts use of persistent memory for mirroring the redo and undo information of one or more computing devices, in accordance with an embodiment of the present disclosure. FIG. 3A is described in conjunction with elements from FIGS. 1, and 2. With respect to FIG. 3A, there is shown a cluster system 300A that includes the computing device 102 and the second computing device 110 (of FIG. 1). There is further shown one or more clients 302 and a common storage 304. There is further shown a series of operations 306-to-320. The series of operations 306-to-312 is executed by the computing device 102 and the series of operations 314-to-320 is executed by the second computing device 110.

At operation 306, the computing device 102 (also represented as DB server 0) is configured to execute a process. More specifically, the controller 104 of the computing device 102 is configured to execute the process. In one implementation, the process may be a DB engine process. In another implementation, the process may be used to establish a connection between the computing device 102 and the second computing device 110. Furthermore, the process allows the local memory 106 and the local memory 110A to be exposed to RDMA. Also, in case of a failover, the process takes the "recovering" responsibility. The DB engine process deals with locks, pages, cache memory, ownership, etc.

At operation 308, the computing device 102 (more specifically, the controller 104 of the computing device 102) is configured to receive a command from the one or more clients 302 (or database clients). The received command relates to at least portion of the data stored in the common storage 304 (i.e., the shared memory 112). The computing device 102 is configured to determine redo and undo information (e.g., Redo 0 and Undo 0) based on the command.

At operation 310, the computing device 102 is further configured to store the redo and undo information (i.e., Redo 0 and Undo 0) in the local memory 106 (or the persistent memory). The redo and undo information (i.e., Redo 0 and Undo 0) can be stored in the local memory 106 by use of standard memory read/write instructions or direct persistent memory (PM) access.

At operation 312, the computing device 102 is further configured to store the redo and undo information in the local memory 110A of the second computing device 110 by use of a single sided RDMA write command. As the communication interface 108 of the computing device 102 is configured to connect to the local memory 110A of the second computing device 110. Therefore, the computing device 102 and the second computing device 110 are connected to each other and reserve a space in the local memory (i.e., the local memory 106 and the local memory 110A) of each other. Therefore, the computing device 102 is further configured to store the redo and undo information (i.e., Redo 0 and Undo 0) in the local memory 110A (or the persistent memory) of the second computing device 110. Alternatively stated, the second computing device 110 is configured to receive a request for the reserved space in the local memory 110A to be used by the computing device 102. Consequently, mirrored copies of the redo and undo information (i.e., Redo 0 and Undo 0) is generated in the local memory 110A of the second computing device 110. The mirrored copies of the redo and undo information (i.e., Redo 0 and Undo 0) helps in recovering the data in a case of a failure of the computing device 102 or vice-versa.

Similar, to the series of operations 306-to-312 executed by the computing device 102, the series of operations 314-320 is executed by the second computing device 110 (also represented as DB server 1).

At operation 314, the second computing device 110 is configured to execute the DB engine process.

At operation 316, the second computing device 110 is configured to receive a command from the one or more clients 302. The second computing device 110 is configured to determine redo and undo information (e.g., Redo 1 and Undo 1) based on the received command from the one or more clients 302.

At operation 318, the second computing device 110 is configured to store the redo and undo information (i.e., Redo 1 and Undo 1) in the local memory 110A (or the persistent memory). The redo and undo information (i.e., Redo 1 and Undo 1) can be stored in the local memory 110A by use of standard memory read/write instructions or direct persistent memory (PM) access.

At operation 320, the second computing device 110 is further configured to store the redo and undo information (i.e., Redo 1 and Undo 1) in the local memory 106 of the computing device 102 by use of a single sided RDMA write command. The reason being the second computing device 110 reserves a space in the local memory 106 of the computing device 102. Therefore, mirrored copies of the redo and undo information (i.e., Redo 1 and Undo 1) is generated. The mirrored copies of the redo and undo information (i.e., Redo 1 and Undo 1) helps in recovering the data in a case of a failure of the second computing device 110 (described in detail, for example, in FIG. 3B) or vice-versa.

Thus, each of the computing device 102 and the second computing device 110 is configured to store the respective redo and undo information in the local memory 106 and the local memory 110A, respectively. In contrast to a conventional method, in which the redo and undo information of one or more conventional computing devices are stored in a common storage, resulting into reduced bandwidth and increased latency and cost as well. However, in the cluster system 300A, each of the computing device 102 and the second computing device 110 is configured to store the redo and undo information in the local memory of the each other. The reason being the computing device 102 reserves a space in the local memory 110A of the second computing device 110 or vice-versa. This way, mirrored copies of the redo and undo information (i.e., Redo 0 and Undo 0) of the computing device 102 is generated in the local memory 110A of the second computing device 110. The mirrored copies of the redo and undo information (i.e., Redo 0 and Undo 0) helps in recovering the data in a case of a failure of the computing device 102 or vice-versa. This further results into increased bandwidth and lowest possible latency as well.

Figure 3B:
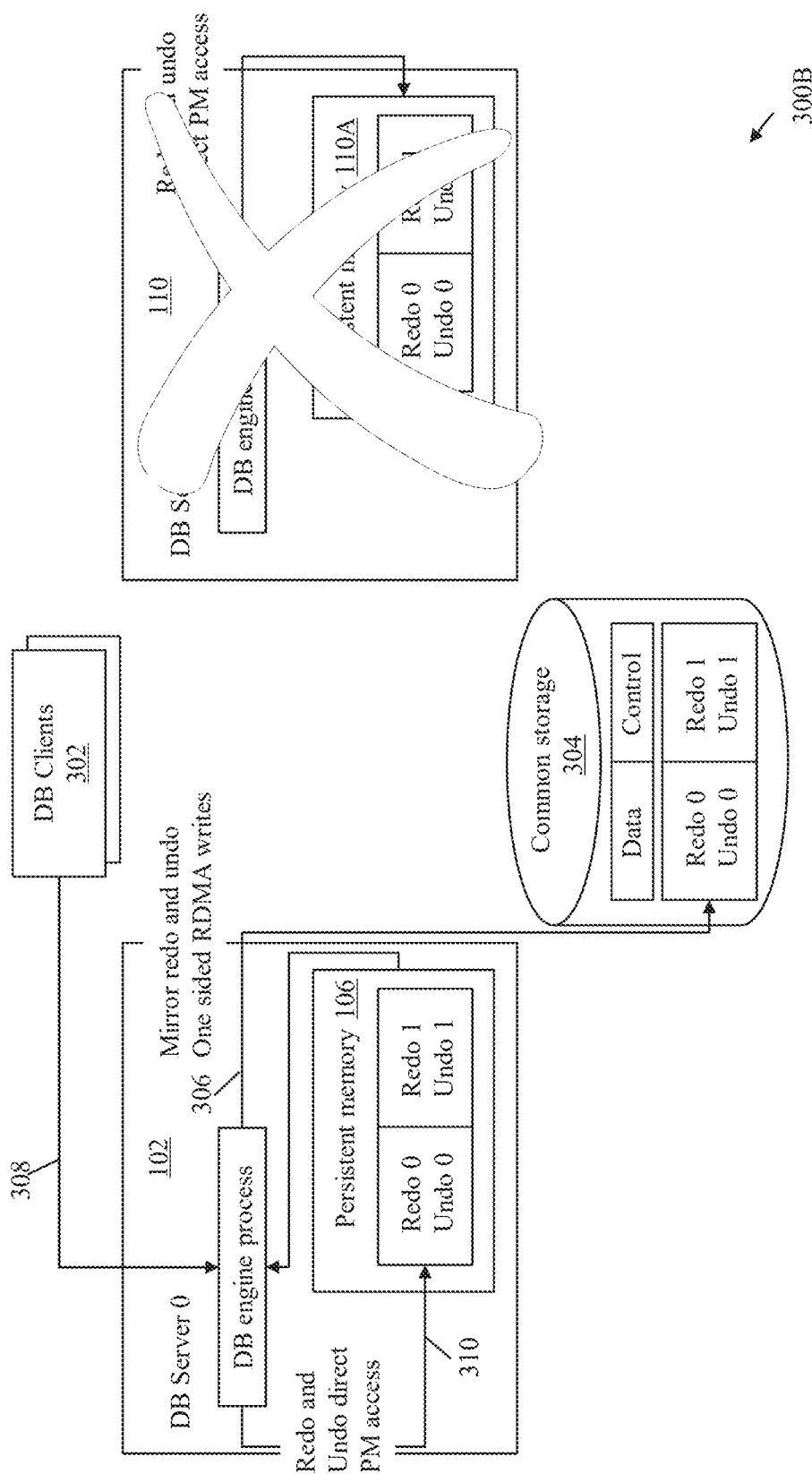
FIG. 3B illustrates a cluster system that depicts use of persistent memory for recovering the lost information using mirrored redo and undo information of a computing device, in accordance with an embodiment of the present disclosure.

FIG. 3B illustrates a cluster system that depicts use of persistent memory for recovering the lost information using mirrored redo and undo information of a computing device, in accordance with an embodiment of the present disclosure. FIG. 3B is described in conjunction with elements from FIGS. 1, 2, and 3A. With respect to FIG. 3B, there is shown a cluster system 300B that includes the computing device 102 and the second computing device 110 (of FIG. 1).

In the cluster system 300B, it has been shown that the connection to the second computing device 110 (i.e., DB server 1) is faulty. In an example, the connection to the second computing device 110 may be either broken, or too slow or not possible. In another example, the connection to the second computing device 110 is termed as faulty, the reason being either the second computing device 110 is not responding or not found or get crashed in the cluster system 300B. However, the lost transactions of the second computing device 110 is recovered by use of mirrored redo and/or undo information stored in the local memory 106 of the computing device 102 (also termed as surviving node or surviving DB server). The redo and/or undo information (i.e., Redo 1 and Undo 1) of the second computing device 110 is mirrored into the local memory 106 of the computing device 102 at operation 320, in the cluster system 300A. Consequently, mirroring the redo and/or undo information of the second computing device 110 in the local memory 106 of the computing device, greatly accelerates the recovery because there is not any requirement to read the redo and/or undo information from common storage.

Moreover, the cluster system 300B is vulnerable to a second failure until the second computing device 110 (or a crashed node) reboots and rejoins the cluster system 300B. In addition, the recovery process and the normal operations (e.g., the series of operations 314-320) during the recovery time generate more redo and/or undo information. The generated redo and/or undo information is mirrored to the local memory 106 of the computing device 102 (or the recovering node) and mirrored to the common storage 304 in order to ensure dual copies. Additionally, the generated redo and/or undo information is tracked and the local memory 110A of the second computing device 110 is updated when the second computing device 110 gets recovered. Thus, the cluster system 300B manifests a way to save a second copy of the redo and/or undo information, in case of failure of the second computing device 110, hence, the cluster system 300B ensures survivability in case of a double failure as well.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A computing device comprising:
   a first local persistent memory;
   a communications interface configured to connect to a second computing device and a shared memory; and
   a controller configured to:
   receive, from a client, a command relating to at least a portion of data stored in the shared memory;
   determine first redo and/or undo information relating to the command;
   store the first redo and/or undo information in the first local persistent memory;
   store the first redo and/or undo information in a second local persistent memory of the second computing device utilizing a remote direct memory access (RDMA) write command;
   determine that a connection to the second computing device is faulty; and
   store the first redo and/or undo information in the shared memory in response to the connection to the second computing device being faulty.

2. The computing device according to claim 1, wherein the controller is further configured to: run a database (DB) engine.

3. The computing device according to claim 1, wherein the first local persistent memory is configured to:
   receive second redo and/or undo information from another computing device; and
   store the second redo and/or undo information in the first local persistent memory.

4. The computing device according to claim 3, wherein the another computing device is the second computing device.

5. The computing device according to claim 1, wherein the controller is further configured to:
   generate, in response to determining that the connection to the second computing device is faulty, second redo and/or undo information during a recovery of the connection to the second computing device;
   store the second redo and/or undo information in the first local persistent memory and the shared memory; and
   store the second redo and/or undo information in the second local persistent memory after recovery of the connection to the second computing device.

6. The computing device according to claim 1, wherein the controller is further configured to store the first redo and/or undo information in the first local persistent memory using direct memory access.

7. The computing device according to claim 1, wherein the computing device is configured to operate as a database server in a database system, and wherein the client is a database client.

8. A method comprising:
   receiving, from a client, a command relating to at least a portion of data stored in a shared memory;
   determining first redo and/or undo information relating to the command;
   storing the first redo and/or undo information in a first local persistent memory;

storing the first redo and/or undo information in a second local persistent memory of a second computing device utilizing a remote direct memory access (RDMA) write command;
determining that a connection to the second computing device is faulty; and
storing the first redo and/or undo information in the shared memory in response to the connection to the second computing device being faulty.

9. The method according to claim 8, further comprising running a database (DB) engine.

10. The method according to claim 8, further comprising:
receiving second redo and/or undo information from another computing device; and
storing the second redo and/or undo information in the first local persistent memory.

11. The method according to claim 10, wherein the another computing device is the second computing device.

12. The method according to claim 8, further comprising:
generating, in response to determining that the connection to the second computing device is faulty, second redo and/or undo information during a recovery of the connection to the second computing device;
storing the second redo and/or undo information in the first local persistent memory and the shared memory; and
storing the second redo and/or undo information in the second local persistent memory after recovery of the connection to the second computing device.

13. The method according to claim 8, further comprising storing the first redo and/or undo information in the first local persistent memory using direct memory access.

14. The method according to claim 8, further comprising configuring a computing device to implement the method as a database server in a database system, wherein the client is a database client.

15. A computer program product comprising a non-transitory computer readable medium storing instructions that, when executed by one or more processors, cause a computing device to:
receive, from a client, a command relating to at least a portion of data stored in a shared memory;
determine first redo and/or undo information relating to the command;
store the first redo and/or undo information in a first local persistent memory; and
store the first redo and/or undo information in a second local persistent memory of a second computing device utilizing a remote direct memory access (RDMA) write command;
determine that a connection to the second computing device is faulty; and
store the first redo and/or undo information in the shared memory in response to the connection to the second computing device being faulty.

16. The computer program product according to claim 15, wherein the instructions, when executed by the one or more processors, further cause the computing device to run a database (DB) engine.

17. The computer program product according to claim 15, wherein the instructions, when executed by the one or more processors, further cause the computing device to:
receive second redo and/or undo information from another computing device; and
store the second redo and/or undo information in the first local persistent memory.

18. The computer program product according to claim 15, wherein the instructions, when executed by the one or more processors, further cause the computing device to:
generate, in response to determining that the connection to the second computing device is faulty, second redo and/or undo information during a recovery of the connection to the second computing device;
store the second redo and/or undo information in the first local persistent memory and the shared memory; and
store the second redo and/or undo information in the second local persistent memory after recovery of the connection to the second computing device.

19. The computer program product according to claim 15, wherein the instructions, when executed by the one or more processors, further cause the computing device to store the first redo and/or undo information in the first local persistent memory using direct memory access.

20. The computer program product according to claim 15, wherein the instructions, when executed by the one or more processors, further cause the computing device to configure the computing device as a database server in a database system, and wherein the client is a database client.

* * * * *

UNITED STATES PATENT AND TRADEMARK OFFICE
CERTIFICATE OF CORRECTION

PATENT NO. : 12,493,538 B2
APPLICATION NO. : 18/432327
DATED : December 9, 2025
INVENTOR(S) : Roman Yakovenko, Michael Hirsch and Dan Bar Dov Page 1 of 1

It is certified that error appears in the above-identified patent and that said Letters Patent is hereby corrected as shown below:

In the Claims

Claim 2, Column 14, Line 31: "configured to: run a" should read "configured to run a"

Signed and Sealed this
Tenth Day of February, 2026

John A. Squires
*Director of the United States Patent and Trademark Office*